United States Patent [19]

Fox

[11] Patent Number: 4,957,639
[45] Date of Patent: Sep. 18, 1990

[54] METHOD FOR ENHANCING RECOVERY OF OIL AND COMPOSITIONS RELATED THERETO

[75] Inventor: J. Thomas Fox, Beaumont, Tex.

[73] Assignee: Emox High Technology, Inc., Winnie, Tex.

[21] Appl. No.: 55,840

[22] Filed: Jun. 1, 1987

[51] Int. Cl.$^5$ .............................................. E21B 43/22
[52] U.S. Cl. ................................. 252/8.554; 166/275; 166/305.1
[58] Field of Search ........................... 252/8.554, 8.551; 166/275, 305.1

[56] References Cited

U.S. PATENT DOCUMENTS

| | | |
|---|---|---|
| 2,265,962 | 12/1941 | Bent et al. . |
| 2,614,993 | 10/1952 | Montenyohi ........................ 252/313 |
| 2,614,994 | 10/1952 | Balthis ............................. 252/313.1 |
| 2,633,919 | 4/1953 | Bauer et al. . |
| 2,761,843 | 9/1956 | Brown .............................. 252/8.554 |
| 2,846,012 | 8/1958 | Lorenz et al. . |
| 2,935,475 | 5/1960 | Bernard . |
| 2,954,825 | 10/1960 | Bernard ................................ 166/9 |
| 2,958,578 | 11/1960 | Baker et al. . |
| 2,967,828 | 1/1961 | Ihde . |
| 3,097,694 | 7/1963 | Kerver . |
| 3,129,176 | 4/1964 | Ihde . |
| 3,367,739 | 2/1968 | Shoaff ................................. 23/110 |
| 3,640,343 | 2/1972 | Darley ........................ 166/305.1 X |
| 3,650,977 | 3/1972 | Bobb ................................... 252/313 |
| 3,700,031 | 10/1972 | Germer, Jr. ........................ 166/270 |
| 3,749,759 | 7/1973 | Freyhold ............................ 423/332 |
| 3,751,371 | 8/1973 | Redmore et al. . |
| 3,777,817 | 12/1973 | Feuerbacher et al. ............. 166/274 |
| 3,805,893 | 4/1974 | Sarem . |
| 3,871,452 | 3/1975 | Sarem ................................ 166/270 |
| 3,871,453 | 3/1975 | Sarem ................................ 166/270 |
| 3,920,074 | 11/1975 | Sarem ................................ 166/274 |
| 3,927,716 | 12/1975 | Burdyn et al. ..................... 166/270 |
| 3,965,986 | 6/1976 | Christopher ....................... 166/292 |
| 3,994,344 | 11/1976 | Friedman .......................... 166/270 |
| 4,029,747 | 6/1977 | Merkl . |
| 4,081,029 | 3/1978 | Holm . |
| 4,117,088 | 9/1978 | Merkl ................................ 423/299 |
| 4,117,099 | 9/1978 | Merkl . |
| 4,141,416 | 2/1979 | Holm . |
| 4,208,305 | 6/1980 | Kouwenhoven et al. . |
| 4,317,487 | 3/1982 | Merkl .............................. 166/305.1 |
| 4,359,093 | 11/1982 | Bernard . |
| 4,458,755 | 7/1984 | Southwick ......................... 166/250 |
| 4,634,540 | 1/1987 | Ropp ................................ 252/8.551 |

OTHER PUBLICATIONS

P. E. Mbaba et al., "Field Application of an Additive Containing Sodium Metasilicate During Steam Stimulation," Society of Petroleum Engineers of AIME, paper No. 12058, 1983.

*Primary Examiner*—Robert L. Stoll
*Assistant Examiner*—Gary L. Geist
*Attorney, Agent, or Firm*—Finnegan, Henderson, Farabow, Garrett & Dunner

[57] ABSTRACT

A method for enhancing recovery of oil from wells by introducing into an oil-bearing formation the reaction products obtained by reacting silicon metal, alkali metalhydroxide and at least one organic di-, tri- or tetramine in an aqueous medium. The products of said reaction are also claimed.

5 Claims, No Drawings

METHOD FOR ENHANCING RECOVERY OF OIL AND COMPOSITIONS RELATED THERETO

BACKGROUND OF THE INVENTION

1. Field of Invention

This invention relates generally to the field of oil production and more particularly concerns a method for enhancing recovery of oil from wells.

2. Description of the Prior Art

Roughly half of the energy of the United States comes from oil which is either imported or extracted from domestic sources. Despite long-term increases in oil prices, domestic production of crude oil has declined in the face of stepped-up drilling nationally and the development of the Alaska pipeline. While recent efforts have curtailed U.S. imports, the majority of oil in the United States remains in the ground.

The principle reason this oil has not been recovered is because it is economically difficult to extract due to attractive forces between the oil and the rock formations in which it resides. Van der Waals, surface tension and other inter-molecular attractive forces cause the oil to adhere to the rock. As a result, for every one barrel of oil that is extracted from a well, approximately two barrels remain in the ground. Estimates by the U.S. Department of Energy suggest that 334 billion barrels of oil are in place that are not economically recoverable with conventional technology.

Over the last decade, much research has been conducted into methods of extracting and recovering this oil, and numerous methods of secondary and tertiary recovery have been developed. Among these methods, the simplest technique for enhancing oil recovery is water flooding.

With this technique, a new hole is drilled in the vicinity of a producing well and water is pumped into the formation to provide the necessary pressure to keep oil in the formation flowing toward the producing well. The exact location of the well and the selection of water injection points requires considerable geologic expertise. Approximately 90% of all U.S. oil fields use this technique as a secondary recovery method. However, water alone is not an ideal substance for moving oil through porous rock because water tends to flow through the larger channels in the rock and leave much of the oil in the smaller channels. Because water and oil do not mix, the majority of oil remains adhered to the rock formation.

An alternate method of recovery is known as the "Micellar-Polymer Process" which is an improvement on the water flooding technique that uses detergents and surfactants to reduce the surface tension between water and oil and increase the efficiency of water in driving oil out of the well. Generally a molecule having an organophilic end and a polar end is deployed under pressure throughout the formation. The organophilic end is attracted to the oil while the polar end is attracted to water. The result is that much of the oil is organized into tiny droplets called "micells" which are more easily moved through the rock formation to the producing well. Specially prepared polymer solutions are often injected into the formation to facilitate migration of the oil toward the well. While the micellar process is much more expensive than water-flooding, the enhanced recovery makes the process economically feasible.

Unfortunately, the micellar process is not as effective as desired, and much of the oil remains in the ground adhered to the rock formation.

Carbonation of wells has also been proposed as a method of secondary recovery. In this process carbon dioxide is pressurized into the well, forming a liquid phase which is soluble in oil. The primary disadvantage of this technique is that, like water, liquid $CO_2$ passes through the formation much more rapidly than the oil and thus carbonation leaves more oil in place than the micellar polymer process. Moreover, this techique is only effective in wells where about 100 billion barrels of oil remain in place. Of this oil, the technique can assist in recovering only about 10%.

All of the processes mentioned above share the disadvantage of leaving much oil adhering to the rock, and the further disadvantage of being ineffective with heavier crudes and tars that are even less mobile than the average crude.

Steam injection techniques have been developed which heat the heavier constituents to increase fluidity. Generally, the pressurized steam is pumped down separate injection wells to facilitate adequate production rate increases. Obviously, this method involves drilling several new bore holes into the formation and high energy costs. The method has the added disadvantage that in deeper wells, especially those below 2,500 feet, the steam is too cool to do much good. It has been suggested, however, that this technique could lead to the recovery of an additional 1.6 billion barrels of oil.

Many additives that enhance the recovery of oil have been developed. Several of these are designed for use in conjunction with steam injection and down hole surge tool techniques. Down hole surge tools periodically treat sections of the well bore with pressurized fluid to increase the porosity of the treated sections and thus increase production. The tool is usually used at specific distance intervals in the hole and treats localized areas. However, many of these additives, including silicates, have a tendency to clog the well or to destabilize or decompose under the extreme conditions found in subterranean wells, and are not as effective as desired.

Hence, a process for enhancing secondary and tertiary recovery of oil from wells which does not involve substantial expense, which appreciably increases oil production and which employs relatively stable compositions having good shelf life qualities and capable of remaining stable under the conditions found in subterranean wells is both economically and politically desirable.

SUMMARY OF THE INVENTION

It is accordingly an object of the present invention to provide a method for enhancing the recovery of oil from wells.

Another object of the invention is to provide a method for reducing the attractive forces between heavy organics, such as oil, and non-organic surfaces such as silica, rock, and steel, for use in geologic formations, tankers, pipelines and in oil transport.

Still another object is to provide stable compositions for use in oil recovery, having improved shelf life and stability.

Yet another object is to provide recovery additives for use in conjunction with water flooding, steam injection and down hole surge tool techniques.

Yet another object is to provide compositions useful in drilling operations where inhibiting hydration of shales and other colloidal clays or encouraging separation of oils from such clays would be helpful.

Additional objects and advantages of the invention will be set forth in the description that follows and in part will be obvious from the description, or may be learned by practice of the invention. The objects and advantages of the invention may be realized and obtained by instrumentalities and combinations particularly pointed out in the appended claims.

To achieve these objects and in accordance with the purpose of the invention, the present invention provides a method for enhancing the recovery of oil from wells comprising:

introducing into an oil-bearing geologic formation the reaction product obtained by reacting an alkaline aqueous solution Group IA and/or IIA metal oxides or hydroxides with silicon metal and at least one nitrogenous organic compound selected from the group consisting of diamines, triamines, tetra amines, di-, tri-, and tetra-amine bottoms and mixtures thereof.

To supplement the availability of amine groups, urea can be used as can carbamides and substituted carbamides.

The metal oxides or hydroxides are preferably sodium and potassium though lithium, beryllium, magnesium, calcium, zinc, and barium oxides or hydroxides can be used and mixtures thereof.

The following organic compounds are preferred as the nitrogenous organic compounds useful in the present invention:

(a) ethylene diamine, diethylene triamine, triethylene tetramine, tetraethylene pentamine, and ethylene diamine bottoms;

(b) propylene diamine, isopropylene diamine, dipropylene triamine, diisopropylene triamine, tripropylene tetramine, isopropylene tetramine, and propylene diamine bottoms;

(c) butylene diamine, dibutylene triamine, isobutylene triamine, secondary butylene triamine, tributylene tetramine, isobutylene triamine, butylene tetramine, or butylene diamine bottoms;

(d) hexamethylene diamine, hexamethylene tetramine, hexamethylene diamine bottoms, and hexamethylene tetramine bottoms;

(e) propylene amine, isopropylene amine, ethylamine, dimethyl amine, diethyl amine, dipropylene amine, isopropylene amine, trimethylamine, triethylene amine, propylamine, isopropylamine, dibutylamine, tributylamine, isobutylamine, butylamine, monohexylamine, dihexylamine, and trihexylamine.

(f) dimethylamino propylamine, diethylamino propylamine, diethylisopropylamine, dipropylamino ethyl amine, and dipropylamino methyl amine; and (g) distillation bottoms of the materials listed in (a)–(g);

(h) piperazine, amino ethyl piperazine and piperazine bottoms;

(i) imidazoles, triazoles, diazoles and/or mixtures thereof;

(j) diazines, triazines and tetrazines and/or mixtures thereof;

(k) morpholine, aminoethyl morpholine; and (l) azodicarbinamide, dicyanodiamidine, guanine; and (m) mixtures thereof.

To further achieve the objects of the invention and in accordance with the purpose of the invention, the present invention provides compositions useful in the recovery of oil from subterranean wells that are more stable than heretofore available compounds. The compositions comprise the reaction product obtained by reacting silicon metal in an alkaline aqueous solution containing one or more Group IA and/or Group IIA metal oxides or hydroxides and at least one organic compound from the group consisting of:

(a) ethylene diamine and related compounds such as ethylene diamine, diethylene triamine, triethylene tetramine, tetraethylene pentamine, and ethylene diamine bottoms;

(b) propylene diamine compounds such as propylene diamine, isopropylene diamine, dipropylene triamine, diisopropylene triamine, tripropylene tetramine, isopropylene tetramine, and propylene diamine bottoms;

(c) butylene diamine compounds such as butylene diamine, dibutylene triamine, isobutylene triamine, secondary butylene triamine, tributylene tetramine, isobutylene triamine, butylene tetramine, or butylene diamine bottoms;

(d) hexamethylene diamine compounds such as hexamethylene diamine, hexamethylene tetramine, hexamethylene diamine bottoms, and hexamethylene tetramine bottoms;

(e) propylene amine compounds such as propylene amine, isopropylene amine, ethylpropylene amine, dimethylpropylene amine, diethylpropylene amine, dipropylene amine, isopropylene amine, trimethylamine, triethylene amine, propylamine, isopropylamine, dibutylamine, tributylamine, isobutylamine, butylamine, secondary amine, monohexylamine, dihexylamine, and trihexylamine.

(f) alkyl amino and di-alkyl amino compounds such as dimethylamino propylamine, diethylamino propylamine, diethylisopropylamine, dipropylamino ethyl amine, and dipropylamino methyl amine; and (g) distillation bottoms of the materials listed in (a)–(f);

(h) piperazine, amino ethyl piperazine and piperazine bottoms;

(i) imidazoles, triazoles, diazoles and/or mixtures thereof;

(j) diazines, triazines and tetrazines and/or mixtures thereof;

(k) morpholine, aminoethyl morpholine;

(l) azodicarbamide, dicyanodiamidine, guanine; and (m) mixtures thereof.

When introduced into oil wells, applicant's invention can substantially increase oil production without undesirable side effects. The method of the invention can be used alone or in conjunction with other known oil well recovery techniques.

Applicant's compounds are believed to be Group IA and IIA metal silicates. The characteristics of applicant's compositions also promise that they will be useful during oil well drilling operations as drilling mud additives, since they tend to separate oil from cuttings and keep shales and hydrophylic clays from swelling and absorbing water or oils.

While separating oil and heavy organics from oil-bearing geologic formations is one application of applicant's invention, it is intended to be useful in all areas where it may be desirable to prevent or inhibit oil from adhering to inorganic surfaces. Some contemplated uses are in coating pipes and tanker linings used in oil transport.

DETAILED DESCRIPTION OF THE PREFERRED EMBODIMENTS

Reference will now be made in detail to the presently preferred embodiments of the invention.

In accordance with the invention, a method for enhancing recovery of oil from wells is provided.

It has been discovered that the introduction of certain silicates into oil wells increases oil recovery in those wells. Specifically, it has been discovered that the reaction products of silicon metal with certain organic materials produces a mixture capable of drastically improving oil well production. It is believed that the reaction products comprise group IA and IIA silicates, Group IA and IIA silicon amine dimers, trimers and tetramers, and Group IA and IIA silicon-amino-carbonate monomers, dimers, and trimers. The exact composition of the reaction products is unknown, and applicant does not wish to be bound by his theory as to the structure of these compounds.

The materials useful in the present invention are prepared by reacting silicon metal in a strongly alkaline aqueous solution with or for more organic constituents selected from the group consisting of diamines; triamines; tetramines; di-, tri-, tetra-, amine bottoms; polyalkylamines and diamines; tetrahydro oxazines; imidazoles; di-, tri-, and tetrazines; azodicarbamides; dicyanodiamidines; and mixtures thereof.

Generally, by weight, 2 to 30% silicon metal, 2 to 30% alkali metal oxides or hydroxides and 1 to 96% of the organic constituents disclosed above are reacted exothermically to form what is believed to be an aqueous solution of aminated silicates containing an alkali metal selected from potassium, sodium and the like.

The reaction products are relatively stable when compared to previously used additives, and are better able to endure the harsh subterranean environs encountered during oil well drilling and recovery operations. More importantly from a commercial standpoint, they exhibit improved shelf life.

Preferably, the reactants comprise by weight 2 to 15% silicon, 15 to 25% oxides or hydroxides of Group IA and Group IIA metals, and 44 to 55% nitrogenous organics. Urea can optionally be included as a reactant, and is preferably added with at least one additional nitrogenous organic. Carbonates such ammonium carbonate can also be included to enhance performance.

Generally, the reactant products are formed by dissolving alkali metal oxides or hydroxides such as potassium hydroxide or sodium hydroxide in water, dissolving therein silicon metal and adding aminated organic compounds of the type disclosed above. The reaction that occurs is spontaneous and exothermic at temperatures ranging from about $-10°$ C. to about $140°$ C.

It is believed that when introduced into an oil-bearing formation, the aminated silicates act as a thin film spreading agent capable of wetting large areas of an oil-bearing formation and interacting with clays and minerals commonly found in such formations in a manner that "shrinks" or "inhibits" the clay's formation of hydrates and minerals commonly found in such formations. Possibly the polyvalent metal ions, the amines and/or nitride groups within the silicates act upon the hydrogen bonding in such clays and minerals to prevent the formation of gel or hydrate structures and swelling. Additionally, the products have a surfactant action which readily separates the oil from the inorganic sands and other materials present. The shrinking action on the clays and minerals coupled with the surfactant qualities releases hydrocarbons trapped within the formation. Thus, lighter ends and trapped natural gas may be released during the process, and a resultant increase in bottom hole pressure is demonstrated. The primary operative mechanism of increasing recovery is believed to be the reduction of physical bonds between the organics and inorganics in the well.

Oil production is increased when these compositions are added in aqueous solution at a concentration of at least 1000 ppm, preferably between 3,000 ppm and 15,000 ppm. It is preferred that the pH of the aqueous injection fluid be maintained at values greater than 7.0, especially values above 10, and conventionally buffered alkali can be used for this purpose.

The exact mechanism by which the composition invades an oil formation, increasing oil flow, is unknown. It is possible that some of the minerals in the formation are dissolved upon contact and that the increased rate of flow is due to an increase in the actual porosity of the well. More likely, the intermolecular attractions between the oil and other constituents in the formation are interrupted and as a result the effective porosity of the well is increased. It is also suspected that the aqueous solutions of the reactant products inhibit the formation of silica gel structures which have a tendency to clog the well formations. It may be that the claimed products help maintain shales, clays, and other organophilic materials in the well in discrete fragments, rather than permitting them to swell and expand.

One of the beneficial qualities of the product solution is that it can be injected into the well at reduced pressures and still achieve rapid dissipation throughout the formation. Hence, well head operating costs are reduced.

The following scaled-down examples, which are incorporated in and constitute part of this application, are intended to be illustrative of the present invention and not limiting.

EXAMPLE 1

To a 300 milliliter three neck flask having three water condensers vented to the air and cooled by circulating water, the following materials are added: 500 milligrams of silicon metal one inch particles or smaller, 99% pure); 65 grams of dimethylene triamine; 900 grams of water and 250 grams of KOH (89%) flake. The materials are mixed and an exothermic reaction occurs that results in silicates containing organo-amine or organo-nitride groups. The resultant liquid is decanted and the remaining materials are diluted to a specific gravity of 1.3 at 25° C. The viscosity of the product is about 30 centipose at 25° C.

EXAMPLE 2

500 grams of silicon metal, 65 grams of diethylene tetramine, 163 grams of sodium hydroxide, and 800 grams of water are reacted in a manner similar to Example 1.

EXAMPLE 3

500g of silicon, 250 grams of KOH—(90%); 35 grams of dimethylene tetramine; 30 grams of urea; and 300 grams of water are reacted in a manner similar to Example 1. The resultant product viscosity is 35 centipose at 25° C.

EXAMPLE 4

500 grams of silicon metal; 65 grams of diethylene tetramine; 30 grams of urea; 800 grams of water and 163 grams of sodium hydroxide (98%) are reacted in a manner similar to Example 1. The resultant product viscosity is 25 centipose at 25° C.

EXAMPLE 5

500 grams of silicon metal; 82 grams of sodium hydroxide (99%); 125 grams of potassium hydroxide (89% ; 30 grams of urea 35 grams of diethylene tetramine and 800 grams of water are reacted in a manner similar to Example 1. The resultant product viscosity is 35 centipose at 25° C.

EXAMPLE 6

500 grams of silicon metal; 65 grams of diethylene tetramine; mine; 82 grams of sodium hydroxide and 125 grams of potassium hydroxide and 800 grams of water are reacted in a manner similar to Example 1. The resultant product viscosity is 32 centipose at 25 degrees °C.

EXAMPLE 7

500 grams of silicon metal; 70 grams diethylene triamine; 250 grams of KOH (98%); 800 grams of 70% sodium hydroxide and 900 grams water are reacted in a manner similar to Example 1. The resultant product viscosity is 20 centipose at 25° C.

EXAMPLE 8

500 grams of silicon metal; 70 grams diphenylene triamine; 166 grams of sodium hydroxide (98%); and 800 grams of water are reacted in a manner similar to Example 1. The resultant product viscosity is 80 centipose at 25° C.

EXAMPLE 9

500 grams of silicon metal; 83 grams of sodium hydroxide (98%); 125 grams of potassium hydroxide (89%); 70 grams of diphenylene triamine; 800 grams of water are reacted in a manner similar to Example 1. The resultant product viscosity is 42 centipose at 25° C.

EXAMPLE 10

500 grams of silicon metal; 35 grams of diphenylene triamine; 30 grams of urea; 83 grams of potassium hydroxide (98%) and 800 grams water are reacted in a manner similar to Example 1. The resultant product viscosity is 45 centipose at 25° C. and specific gravity is 13.

EXAMPLE 11

500 grams of silicon metal; 68 grams of dibutyl amine 30 grams of urea; 250 grams of potassium hydroxide (98%); and 800 grams of water are reacted in a manner similar to Example 1. The resultant product viscosity is 30 centipose at 25° C.

EXAMPLE 12

800 grams of silicon metal; 250 grams of potassium hydroxide (89%); 65 grams of dibutyl diamine; 60 grams of urea; and 800 grams of water; are reacted in a manner similar to Example 1. The resultant product viscosity is 25 centipose at 25° C.

EXAMPLE 13

500 grams of silicon metal; 250 grams of potassium hydroxide; 100 grams of hexamethylene diamine; and 800 grams of water; are reacted in a manner similar to Example 1. The resultant product viscosity is 37 centipose at 25° C.

EXAMPLE 14

500 grams of silcion metal; 161 grams of sodium hydroxide; 117 grams of hexamethylene diamine; and 800 grams of water; are reacted in a manner similar to Example 1. The resultant product viscosity is 25 centipose at 25° C.

EXAMPLE 15

500 grams of silicon metal; 83 grams of sodium hydroxide (98%); 125 grams of potassium hydroxide (89%); 117 grams of hexamethylene diamine and 1000 grams of water are reacted in a manner similar to Example 1. The resultant product viscosity is 35 centipose at 25° C.

EXAMPLE 16

500 grams silicon metal; 250 potassium hydroxide; 57 grams of hexamethylene diamine; 30 grams of urea; and 800 grams of water: are reacted in a manner similar to Example 1. The resultant product is diluted to a viscosity of 35 centipose at 25° C.

EXAMPLE 17

500 grams silicon metal; 250 grams potassium hydroxide (89%); 74 grams of propylene diamine; 840 grams water; are reacted in a manner similar to Example 1. The resultant product viscosity is 30 centipose at 25° C.

HYPOTHETICAL EXAMPLE 18

500 grams silicon metal; 160 grams propylene diamine, 250 grams potassium hydroxide, 800 grams water, are reacted in a manner similar to Example 1. The resultant product viscosity is 35 centipose at 25° C.

HYPOTETHICAL EXAMPLE 19

500 grams silicon metal; 250 grams potassium hydroxide (89%); 101 grams triethylene amine; 35 grams of imidazole; and 800 grams water are reacted in a manner similar to Example 1. The resultant product viscosity is 85 centipose at 25° C.

HYPOTHETICAL EXAMPLE 20

500 grams of silicon; 166 grams of sodium hydroxide (89%); 104 grams of amino ethylene ethanol amine; and 800 grams of water; are reacted in a manner similar to Example 1. The resultant product is diluted to a viscosity of 25 centipose and a 1.3 specific gravity.

HYPOTHETICAL EXAMPLE 21

500 grams silicon metal; 166 grams sodium hydroxide; 194 grams of piperazene hydrate; and 900 grams of water are reacted in a manner similar to Example 1. The resultant product has a viscosity of 50 centipose at 25° C.

HYPOTHETICAL EXAMPLE 22

500 grams silicon metal; 166 grams of sodium hydroxide; 120 grams of amino ethyl morpholine; and 800 grams of water are reacted in a manner similar to Example 1. The resultant product has a viscosity of about 55 centipose at 25° C.

HYPOTHETICAL EXAMPLE 23

500 grams of silicon metal; 166 grams of sodium hydroxide (98%); 70 grams imidazole; and 800 grams water is are reacted in a manner similar to Example 1. The resultant product viscosity is 29 centipose at 25° C.

USE OF PRODUCT IN WELLS

The reactions discussed in the examples could be carried out on a commercial scale using the same relative percentages of material. Care should be taken, however, in adding the caustic materials, since if added too quickly, a violent exothermic reaction ensues that may damage the reaction vessel or cause "blowout." Generally, adding about three quarters of the necessary alkali metal oxide or hydroxide at first, and then the remaining quarter after reaction conditions have stabilized is advisable.

Once the reaction is complete, (generally after about twelve hours in a large scale reaction vessel), a supernatent liquid will usually form. This liquid contains unreacted constituents and other unknowns and is decanted. The remaining materials is diluted, preferably with water or alkaline water having a pH of 10+, to a specific gravity of approximately 1.3. Dilution of the product is not considered critical. The preferred dilutions range between 30% and 60% by weight product, giving a product between 3,000 and 30,000 ppm silicates. The dilute solution can be shipped to the drill site and further diluted, if necessary, during injection. No special precautions are necessary when adding the materials into the well, though care should be taken to avoid contacting the skin with the caustic mixture. The solutions are added by conventional means at the injection well. The solutions can be used in conjunction with known surge tool and steam injection techniques.

Other ingredients can be added to buffer the solution or provide additional ionic constituents which may be useful in dispersing clays during recovery. Such ingredients include ammonium carbonate, potassium carbonate, sodium carbonate, and the like. These may also be incorporated into the reaction vessel at the time of reaction, resulting in a silicate that includes, or contains, carbonate groups. Similarly, urea and guanine can be incorporated during the reaction.

Plastic lined drums are preferred as a means for transporting the materials.

The following examples used a 500 ml. flask connected to water-cooled reflex condenser. The flask contained silicon metal. Other constituents were added in the same order as listed below.

EXAMPLE 24

Reaction of amino ethyl ethanolamine:

FORMULA

45% potassium hydroxide: 100 grams
silicon metal: 50 grams
amino ethyl ethanolamine: 24 grams
water: 150 grams The reaction was carried out for 24 hrs under slight heat (70°). The finished product had sp. gr. of 1.18 at 25° C. A clear slightly yellow liquid was formed after filtration with a pH of 12 and a water loss of 8%.

EXAMPLE 25

Reaction of amino ethyl ethanolamine with urea

FORMULA silicon metal: 50 grams
45% KOH: 100 grams
amino ethyl ethanolamine: 12 grams
urea: 12 grams
water: 150 grams The reaction was carried out for 24 hrs under a slight heat of about 70° C. with a 10% water loss. The finished product had a sp. gr. of 1.16 at 25° C. and formed a clear yellow liquid with a pH of 14.

EXAMPLE 26

Reaction of diethylene triamine (DETA):

FORMULA silicon metal: 50 grams
45 % potassium hydroxide: 100 grams
diethylene triamine: 20 grams
water: 100 grams The reaction was carried out for 24 hrs under slight heat (50°) with a 6% water loss. The finished product had two layers. The upper layer was decanted and the bottom liquid layer of silicate which contains DETA reaction products.

The finished product had a sp. gr. at 25° C. of 1.22 and formed a clear water-white liquid with a pH of 13.5.

EXAMPLE 27

Reaction of diethylene triamine (DETA) and urea blend

FORMULA silicon metal: 50 grams
45% potassium hydroxide: 100 grams
DETA: 10 grams
urea: 10 grams
water: 126 grams The reaction was carried out under slight heat (50°) for 24 hrs. The urea and DETA reaction product did not separate. The sp. gr. at 25° of the resulting liquid was 1.21. The liquid was a clear, slightly yellow water-white liquid with a pH of 12. The water loss was 2%.

EXAMPLE 28

Reaction of dipropylene triamine (DPTA):

FORMULA silicon metal: 50 grams
45% potassium hydroxide: 100 grams
dipropylene triamine: 24 grams
water: 100 grams The reaction was carried out for 24 hrs at 60° C. with a 6% water loss. The resulting product had a bottom layer that was slightly yellow, clear liquid and a top layer that was yellow liquid of DPTA and water. The decanted bottom layer of silicate complex solution had a sp. gr. at 25° C. of 1.22 and a pH of 12.

EXAMPLE 29

Reaction of dipropylene triamine (DPTA) and urea:

FORMULA silicon metal: 50 grams
45% potassium hydroxide: 100 grams

DPTA: 14 grams
urea: 11 grams
water: 150 grams

The reaction was carried out for 24 hrs at 50° C. The resulting product was a clear, water white liquid with a sp. gr. at 25° C. of 1.45 and a pH of 12.

EXAMPLE 30

Reaction of dibutylamine:

FORMULA silicon metal: 50 grams
45% potassium hydroxide: 100 grams
dibutylamine: 50 grams
water: 150 grams The reaction was carried out at room temperature for 48 hrs because heat would volatilize dibutylamine. The resulting product was a clear, water-white solution with a sp. gr. at 25° C. of 1.23 and a pH of 12. Water and amine loss was 15%.

EXAMPLE 31

Reaction of propylene diamine

FORMULA silicon metal: 50 grams
45% potassium hydroxide: 100 grams
propylene diamine: 24 grams
water: 150 grams The reaction was carried out for 24 hrs at room temperature. The final product had two layers, both of which were water white and clear. The bottom layer had a sp. gr. of 1.22 at 25° water and the diamine loss was 10%. The pH was 12.

A bench test for screening materials for comparison of urea-reaction-based products is as follows:

Samples of the above reacted products were added to samples of oil and sand mixed with water [tap water and formation fluid containing 0.5% max. of salts] to check the speed and cleanness of separation.

FORMULA sand (unwashed formation sand): 25 grams
oil API gravity 38 Saratoga Field): 20 grams
oil API gravity 27 (Wilcox Formation): 20 grams
water (or formation fluid): 100 grams
sample comparison: 1 gram & .05 grams The samples were prepared in 500 ml. graduated Erlenmeyer flasks with rubber stoppers and shaken vigorously for 20 seconds. They were allowed to stand to check separation. Some samples were heated and shaken again at 80° C.

All of the diamine and organic amines reactions with silicon metal and alkaline hydroxide had lower surface tensions than the straight urea reactions. Simple rust tests showed that the diamine materials gave improved rust inhibition than straight urea reactions. The degree and speed of separation of oil coated sands showed increased wetting and oil release when organic diamines were present in the finished product.

Therefore, this invention increases the penetration of the solution into the formulation by lowering of the surface tension of the solution with a conc. of 4% or below when using fresh water or formation fluid. The release of the oil and gas from the formation sands and the subsequent coating of the sands will speed and increase the oil and gas formation. Reactions of urea and the diamines with the silicon and hydroxide were particularly effective, and lower concentrations of hydroxide and/or diamine ratios can be used (4% diamine and lower), in the formulation.

What is claimed is:

1. A method for enhancing the recovery of oil from subterranean formations comprising:
    (a) reacting in alkaline aqueous solution 2 to 30%, by weight, a group IA and/or IIA metal oxides or hydroxides with 2 to 30%, by weight, a silicon metal and 1 to 96%, by weight, of at least one nitrogenous organic compound selected from the group consisting of diamines, triamines, di-, tri-, tetra- amine bottoms; and mixtures thereof;
    (b) introducing said solution of (a) into an oil-bearing geologic formation; and
    (c) recovering said oil.

2. The method of claim 1 wherein said alkaline aqueous solution additionally includes at least one member from the group consisting of urea, ammonium carbonate; potassium carbonate; and sodium carbonate.

3. A method of encouraging the dissociation of oil from inorganic and metallic surfaces including the steps of contacting said surfaces with the reaction product obtained by reacting in alkaline aqueous solution 2 to 30%, by weight, a group IA and/or IIA metal oxides or hydroxides with 2 to 30%, by weight, a silicon metal and 1 to 96%, by weight, of at least one nitrogenous organic compound selected from the group consisting of diamines, triamines, di-, tri-, tetra- amine bottoms; and mixtures thereof.

4. The method of claim 3 wherein said surface is contacted with said reaction product in a dilute aqueous solution comprising at least 1,000 ppm of said reaction product.

5. A method for enhancing the recovery of oil from subterranean formations comprising:
    (a) reacting in alkaline aqueous solution 2 to 30%, by weight, a group IA and/or IIA metal oxides or hydroxides with 2 to 30%, by weight, a silicon metal and 1 to 96%, by weight, of at least one nitrogenous organic compound selected from the group consisting of;
        (1) ethylene diamine, diethylene triamine, triethylene tetramine, tetraethylene pentamine, and ethylene diamine bottoms;
        (2) propylene diamine, isopropylene diamine, dipropylene triamine, diisopropylene triamine, tripropylene tetramine, isopropylene tetramine, and propylene diamine bottoms;
        (3) butylene diamine, dibutylene triamine, isobutylene triamine, secondary butylene triamine, tributylene tetramine, isobutylene triamine, butylene tetramine, or butylene diamine bottoms;
        (4) hexamethylene diamine, hexamethylene tetramine, hexamethylene diamine bottoms, and hexamethylene tetramine bottoms;
        (5) propylene amine, isopropylene amine, ethylamine, dimethyl amine, diethyl amine, dipropylene amine, isopropylene amine, trimethylamine, triethylene amine, propylamine, isopropylamine, dibutylamine, tributylamine, isobutylamine, butylamine, monohexylamine, dihexylamine, and trihexylamine;
        (6) dimethylamino propylamine, diethylamino propylamine, diethylisopropylamine, dipropylamino ethyl amine, and dipropylamino methyl amine;
        (7) distillation bottoms of the materials listed in (1)–(6);

(8) piperazine, amino ethyl piperazine and piperazine bottoms;
(9) imidazoles, triazoles, diazoles and/or mixtures thereof;
(10) diazines, triazines, tetrazines and/or mixtures thereof;
(11) morpholine, aminoethyl morpholine;
(12) azodicarbinamide, dicyanodiamidine, guanine; and
(13) mixtures thereof;
(b) introducing said solution of (a) into an oil-bearing geologic formation; and
(c) recovering said oil.

* * * * *